United States Patent

Guo et al.

[11] Patent Number: 6,127,500
[45] Date of Patent: Oct. 3, 2000

[54] PROCESS FOR MAKING ALLYLIC COPOLYMER RESINS

[75] Inventors: Shao Hua Guo, West Chester; Daniel B. Pourreau, Exton, both of Pa.

[73] Assignee: Arco Chemical Technology, L.P., Greenville, Del.

[21] Appl. No.: 09/392,381

[22] Filed: Sep. 9, 1999

Related U.S. Application Data

[62] Division of application No. 09/085,039, May 26, 1998, Pat. No. 5,986,031.

[51] Int. Cl.[7] .................. C08F 236/00; C08F 220/12; C08F 220/18
[52] U.S. Cl. .................. 526/329.1; 526/321; 526/329.2; 526/340
[58] Field of Search ................... 526/329.1, 321, 526/329.2, 340

[56] References Cited

U.S. PATENT DOCUMENTS

| | | | |
|---|---|---|---|
| 3,268,561 | 8/1966 | Peppel et al. | 260/348 |
| 4,618,703 | 10/1986 | Thanawalla et al. | 560/209 |
| 4,925,893 | 5/1990 | Padget et al. | 524/337 |
| 5,153,261 | 10/1992 | Brooks | 525/28 |
| 5,296,544 | 3/1994 | Heise et al. | 525/28 |
| 5,475,073 | 12/1995 | Guo | 526/333 |
| 5,480,943 | 1/1996 | Guo | 525/330.5 |
| 5,525,693 | 6/1996 | Guo | 526/329.2 |
| 5,534,598 | 7/1996 | Guo | 526/329.2 |
| 5,571,884 | 11/1996 | Guo | 526/329.6 |

OTHER PUBLICATIONS

Swern et al., "Chemistry of Epoxy Compounds. VII[2] Reaction of Allyl Alcohol with Unsymmetrical Oxirane Compounds. An Electronic Interpretation", *J. Am. Chem. Soc. 71*, (1949) pp. 1152–1156.

*Primary Examiner*—Tae Yoon
*Attorney, Agent, or Firm*—Jonathan L. Schuchardt; Shao Guo

[57] ABSTRACT

Allylic copolymer resins and processes for making them are disclosed. The resins are made by copolymerizing an ethylenic monomer, a monofunctional allyl monomer, and a multifunctional allyl monomer under free-radical conditions. The multifunctional allyl monomer is used in an amount and manner effective to give a copolymer resin having a polydispersity (Mw/Mn) within the range of about 5 to about 30. The resins, which are easy to make with even bulk polymerization, are particularly valuable, for example, as toner resins, thermoset resins, reactive plasticizers, and rheology modifiers.

6 Claims, No Drawings

PROCESS FOR MAKING ALLYLIC COPOLYMER RESINS

This is a division of appl. Ser. No. 09/085,039, filed May 26, 1998 now U.S. Pat. No. 5,986,031.

FIELD OF THE INVENTION

The invention relates to allylic copolymer resins. In particular, the invention is a process for making copolymer resins from ethylenic and allyl monomers. The resins, which have broad molecular weight distributions, are particularly useful, for example, as toner resins, reactive plasticizers, and rheology modifiers.

BACKGROUND OF THE INVENTION

Free-radical polymerization is widely used to make many important commercial polymers, including polystyrene, acrylic polymers, polyvinyl chloride, and synthetic rubber. The high reactivity of ethylenic monomers often complicates the synthesis. Thus, many free-radical polymerizations are performed in suspensions, emulsions, or solutions using solvents and chain-transfer agents to regulate reaction rate and/or polymer molecular weight. Examples are the processes now used to make resins for electrophotographic toners.

Ordinary, black toner resins are high-molecular-weight copolymers of styrene with butadiene or acrylates made by suspension or emulsion polymerization techniques. Because these copolymers can be difficult to pulverize, can adhere poorly to paper, can have poor anti-offset or fusion properties, and can have poor abrasion resistance, newer and more-expensive resins (requiring an even more complex synthesis) have evolved. The newer systems use mixtures of high and low-molecular-weight polymers, or they include a second, low-molecular-weight component (i.e., they are bimodal polymers). While the processability and performance of the new resins are better than that of ordinary toner resins, preparing the new resins can be complicated and expensive.

Allyl alcohol and its derivative monomers (e.g., allyl ethers, allyl esters, and alkoxylated allylic alcohols) readily copolymerize with ethylenic monomers (e.g., styrene or methyl methacrylate) to give low-molecular-weight, hydroxy-functional resins. We have described these hydroxy-functional resins and ways to make them in several recently issued patents (see, e.g., U.S. Pat. Nos. 5,475,073, 5,525,693, and 5,571,884). As we noted there, the allyl monomer helps to control the molecular weight of the polymer and eliminates the need for the solvents and chain-transfer agents commonly used in free-radical polymerizations. The resins usually have low molecular weights ($Mn=$ about 1000 to 5000), narrow molecular weight distributions ($Mw/Mn<3$), and evenly distributed hydroxyl groups. As we explained earlier, these resins are valuable reactive intermediates for making high-performance coatings and other thermoset polymers. The resins are crosslinked with melamines, polyisocyanates, epoxies, and other crosslinkers to give useful thermosets (see. U.S. Pat. Nos. 5,534,598 and 5,480,943).

The crosslinkable allylic copolymer resins described above are ideal for many coatings. Unfortunately, however, they are not so valuable as toner resins, for which higher molecular weights and broader molecular weight distributions are generally needed. Making useful high-molecular-weight polymers with broad molecular weight distributions is not always easy, particularly when allylic monomers are used. While crosslinking monomers such as divinylbenzene (DVB) are commonly used to increase molecular weight in free-radical polymerizations, they can normally be used only in minor concentrations. At high enough DVB levels, excessive crosslinking occurs, and a gelled reaction mixture can result.

Applications other than toners could also benefit from new allylic copolymer resins. Examples include thermoset polymers (which normally include, in addition to the resin, a crosslinker and other optional components such as fillers, thickeners, pigments, and other additives), thermoplastics (which can benefit from plasticizers that can react into the polymer network), and coatings (especially for controlling rheology).

In sum, there is a continuing need for new allylic copolymer resins and ways to make them. Preferably, the resins would offer processing and performance benefits—particularly in the areas of electrophotographic toners—that are not currently available from the low-molecular-weight, hydroxy-functional acrylic resins described above. A preferred process would be inexpensive and simple to practice, and would retain the benefits of earlier processes for making resins from allyl monomers (e.g., good control over molecular weight build even without a solvent or chain-transfer agent). Finally, a preferred process would provide resins having high molecular weights and broad molecular weight distributions but would avoid excessive crosslinking and reactor gellation.

SUMMARY OF THE INVENTION

The invention provides a way to make copolymer resins that are useful as toner resins, thermoset resins, reactive plasticizers, rheology modifiers, and other uses. The invention is a process which comprises copolymerizing an ethylenic monomer in the presence of a monofunctional allyl monomer, a free-radical initiator, and a multifunctional allyl monomer. The key element is the multifunctional allyl monomer, which is used in an amount effective to produce a copolymer resin having a polydispersity (Mw/Mn) within the range of about 5 to about 30.

The process of the invention enables the preparation of high-molecular-weight allylic copolymer resins with broad molecular weight distributions. The resins can be made without reaction solvents or chain-transfer agents, and even bulk polymerization can be used. Incorporating the right amount of multifunctional allyl monomer unexpectedly broadens molecular weight distribution dramatically without causing excessive crosslinking or reactor gellation.

DETAILED DESCRIPTION OF THE INVENTION

The process of the invention comprises copolymerizing an ethylenic monomer in the presence of a monofunctional allyl monomer, a free-radical initiator, and a multifunctional allyl monomer.

Ethylenic monomers suitable for use in the invention contain a —CR=$CH_2$ group wherein R is hydrogen or $C_1$–$C_5$ alkyl. Suitable ethylenic monomers include, for example, vinyl aromatic monomers, unsaturated nitriles, vinyl esters, vinyl ethers, vinyl halides, vinylidene halides, (meth)acrylic acids, (meth)acrylate esters (including hydroxyalkyl (meth)acrylates), (meth)acrylamides, fluoroalkyl(meth)acrylates, conjugated dienes, and the like, and mixtures thereof. Preferred ethylenic monomers are vinyl aromatic monomers, (meth)acrylic acids, (meth) acrylate esters, and conjugated dienes. Particularly preferred is styrene, especially when used with butadiene or a meth (acrylate) ester.

A monofunctional allyl monomer is included in the process of the invention. By "monofunctional allyl monomer," we mean a monomer that contains a single allylic olefin group (—CH—CR=CH$_2$). Suitable monofunctional allyl monomers include allylic alcohols, alkoxylated allylic alcohols, allyl ethers, allyl esters, allyl amines, and allyl carbonates.

Allylic alcohols useful in the process of the invention preferably have the general structure: CH$_2$=CR—CH$_2$—OH in which R is selected from the group consisting of hydrogen and C$_1$–C$_5$ alkyl. Suitable allylic alcohols include, for example, allyl alcohol, methallyl alcohol, 2-ethyl-2-propen-1-ol, and the like, and mixtures thereof. Allyl alcohol and methallyl alcohol are preferred.

Alkoxylated allylic alcohols are also suitable monomers for use in the process. Preferred alkoxylated allylic alcohols have the general structure CH$_2$=CR—CH$_2$—(A)$_n$—OH in which A is an oxyalkylene group, R is selected from the group consisting of hydrogen and C$_1$–C$_5$ alkyl, and n, which is the average number of oxyalkylene groups in the alkoxylated allylic alcohol, has a value from 1 to 50. Preferred oxyalkylene groups are oxyethylene, oxypropylene, oxybutylenes, and mixtures thereof. Most preferred are ethoxylated and propoxylated allylic alcohols having an average of 1 to 10 oxyalkylene groups.

Suitable alkoxylated allylic alcohols can be prepared by reacting an allylic alcohol with up to about 50 equivalents of one or more alkylene oxides in the presence of a basic catalyst as described, for example, in U.S. Pat. Nos. 3,268,561 and 4,618,703, the teachings of which are incorporated herein by reference. As will be apparent to those skilled in the art, suitable alkoxylated allylic alcohols can also be made by acid catalysis, as described, for example, in *J. Am. Chem. Soc.* 71 (1949) 1152.

Preferred allyl ethers have the general structure: CH$_2$=CR—CH$_2$—O—R' in which R is selected from the group consisting of hydrogen and C$_1$–C$_5$ alkyl, and R' is a saturated linear, branched, or cyclic C$_1$–C$_{30}$ alkyl, aryl, or aralkyl group. Suitable allyl ethers include, for example, allyl methyl ether, allyl ethyl ether, allyl tert-butyl ether, allyl methylbenzyl ether, and the like, and mixtures thereof.

Allyl esters can also be used in the process of the invention. Preferred allyl esters have the general structure: CH$_2$=CR—CH$_2$—O—CO—R' in which R is selected from the group consisting of hydrogen and C$_1$–C$_5$ alkyl, and R' is hydrogen or a saturated or unsaturated linear, branched, or cyclic C$_1$–C$_{30}$ alkyl, aryl, or aralkyl group. Suitable allyl esters include, for example, allyl formate, allyl acetate, allyl butyrate, allyl benzoate, methallyl acetate, allyl fatty esters, and the like, and mixtures thereof. Particularly preferred are allyl esters derived from allyl alcohol and methallyl alcohol. Most preferred are C$_1$–C$_5$ alkyl esters of allyl alcohol and methallyl alcohol.

Preferred allyl amines have the general structure: CH$_2$=CR—CH$_2$—NR'R" in which R is selected from the group consisting of hydrogen and C$_1$–C$_5$ alkyl, and R' and R" are hydrogen or a saturated or unsaturated linear, branched, or cyclic C$_1$–C$_{30}$ alkyl, aryl, or aralkyl group. Suitable allyl amines include, for example, allyl amine, N-methyl allyl amine, N-butyl allyl amine, N-benzyl allyl amine, N,N-dimethyl allyl amine, N,N-dibutyl allyl amine, and the like, and mixtures thereof.

Preferred allyl carbonates have the general structure: CH$_2$=CR—CH$_2$—O—CO$_2$R', wherein R is selected from the group consisting of hydrogen and C$_1$–C$_5$ alkyl, and R' is a saturated linear, branched, or cyclic C$_1$–C$_{30}$ alkyl, aryl, or aralkyl group. Suitable allyl carbonates include, for example, methyl allyl carbonate, ethyl methallyl carbonate, and the like, and mixtures thereof.

The relative amounts of ethylenic monomer and monofunctional allyl monomer used are not critical. Preferably, enough of the monofunctional allyl monomer is used to control molecular weight growth and/or incorporate adequate functionality. Preferred resins contain from about 50 to about 90 mole % of the ethylenic monomer, and from about 5 to about 50 mole % of the monofunctional allyl monomer (based on the total amount of polymerizable monomers). A more preferred range is from about 60 to about 80 mole % of the ethylenic monomer, and from about 10 to about 40 mole % of the monofunctional allyl monomer.

The process is performed in the presence of a free-radical initiator. Peroxide, hydroperoxide, and azo initiators well known to those skilled in the art are preferred. Preferred initiators have a decomposition temperature greater than about 100° C. Suitable peroxide initiators include, for example, t-butylperoxide, t-butyl hydroperoxide, di-t-butylperoxide, t-butyl perbenzoate, cumene hydroperoxide, dicumyl peroxide, and the like. The amount of free-radical initiator needed varies, but it is generally within the range of about 0.1 to about 10 wt. % based on the total amount of monomers used. Preferably, the amount of free-radical initiator used is within the range of about 1 to about 5 wt. %. Generally, it is preferred to add the free-radical initiator gradually during the course of the polymerization.

The process includes a multifunctional allyl monomer. By "multifunctional allyl monomer," we mean a monomer that contains an allylic olefin group (—CH—CR=CH$_2$), and at least one additional polymerizable olefinic group, which is preferably another allylic olefin group. Suitable multifunctional allyl monomers include multifunctional allyl ethers, allyl esters, allyl amines, and allyl carbonates. Examples include diallyl phthalate, diallyl carbonate, diallyl ether, propylene glycol diallyl ether, triallyl isocyanurate, allyl diglycol carbonates, allyl meth(acrylate)s, diallyl maleate, diallyl fumarate, triallyl trimellitate, diallyl amine, and the like, and mixtures thereof. Other kinds of multifunctional monomers that lack an allyl group, such as divinylbenzene, are generally not suitable because they homopolymerize too rapidly and can cause excessive crosslinking or reactor gellation.

The amount of multifunctional allyl monomer used is important. It is used in an amount and manner effective to produce a copolymer resin having a polydispersity (Mw/Mn) within the range of about 5 to about 30. Preferably, the polydispersity is within the range of about 10 to about 25; most preferred is the range from about 11 to about 20. As shown in Example 1 and Comparative Examples 2 and 3 (below), enough of the multifunctional allyl monomer must be used to achieve a polydispersity within the range of about 5 to about 30. If the multifunctional allyl monomer is omitted completely (Comparative Example 2), the Mw/Mn is too low. Moreover, if too little of the multifunctional allyl monomer is used (Comparative Example 3), the resin's Mw/Mn will still be too low for desirable processing and performance in many applications, including toners.

The actual amount of multifunctional allyl monomer needed depends on many factors, including the particular multifunctional allyl monomer used, the nature of the other monomers used, the desired degree of crosslinking, and other considerations. Preferably, however, the multifunctional allyl monomer is used in an amount within the range of about 5 to about 50 mole percent based on the combined amounts of allyl monomers. A more preferred range is from about 10 to about 45 mole percent.

The process of the invention is easy to practice. Any conventional free-radical polymerization process can be used, including bulk, suspension, emulsion, or solution processes. An advantage of the process is that it allows even a bulk polymerization process to be used. In contrast, the preparation of conventional toner resins, for example, usually requires a complicated emulsion or suspension polymerization technique.

In a preferred process, the reactor is charged initially with all of the monofunctional and multifunctional allyl monomers to be used, and a minor proportion of the free-radical initiator. The ethylenic monomer(s) and the rest of the free-radical initiator are added gradually to the reactor, which is heated at the desired reaction temperature. The process is preferably performed at a temperature within the range of about 60° C. to about 300° C., more preferably from about 120° C. to about 180° C. When the polymerization is complete, residual unreacted monomers are removed by distillation or wiped-film evaporation.

The invention includes an alternative process for making allylic copolymer resins having high polydispersities. In this process, an ethylenic monomer and a monofunctional allyl monomer (both as described above) are first copolymerized in the presence of a free-radical initiator to give a reaction mixture that contains residual, unreacted allyl monomer. This material has a relatively low molecular weight because the allyl monomer acts as a chain-transfer agent. The supply of allyl monomer in the reaction mixture is then exhausted by continuing to add only ethylenic monomer to the mixture. The remaining ethylenic monomer is then copolymerized substantially in the absence of any allyl monomer. With the allyl monomer reacted out, the remaining ethylenic monomer polymerizes to a relatively high molecular weight. The resulting copolymer resin has (like the resins described earlier) a polydispersity (Mw/Mn) within the range of about 5 to about 30.

Particularly preferred is the process of the preceding paragraph that gives a resin having a bimodal molecular weight distribution. By "bimodal," we mean that gel permeation chromatography (GPC) analysis of a resin sample reveals two or more distinct molecular weight regions, which may or may not overlap. At least two "peak" molecular weights are evident.

Resins of the invention preferably have glass-transition temperatures within the range of about 45° C. to about 85° C. A more preferred range is from about 55° C. to about 70° C.

Resins from either process of the invention are valuable for toners. Typical toner compositions include a resin, a pigment, and other optional components such as flow-control additives, magnetic pigments, charge-control additives, and the like. Toner compositions of the invention comprise an allylic copolymer resin of the invention and other conventional components. The allylic monomer allows resin formulators to incorporate important functional groups (e.g., hydroxyl, amine, ester, ether) evenly throughout the resin chain. These functional groups can enhance the triboelectric properties of the resin, help to disperse the pigments, improve pigment wetting and adhesion of the toner to paper, improve anti-offset or fusion properties, and/or boost abrasion resistance. The resins are also expected to have excellent friability, i.e., they will make toners easy to pulverize compared with conventional toner resins.

Resins of the invention can also be used in thermosets, which normally include, in addition to the resin, a crosslinking agent and other optional components such as fillers, thickeners, pigments, and other additives. The crosslinking agent reacts with functional groups in the resin. For example, a typical resin of the invention has hydroxyl groups derived from allyl alcohol or an alkoxylated allylic alcohol. The thermoset will then include a crosslinking agent that reacts with hydroxyl groups, e.g., one with melamine, isocyanate, epoxy, or anhydride groups. Because the resins of the invention have an unusually broad molecular weight distribution, they should lend unique properties to a variety of thermoset products made with them.

Resins of the invention are valuable as reactive plasticizers. In thermoplastics such as polyvinyl chloride (PVC), for example, non-reactive plasticizers such as dioctyl phthalate are commonly used. However, these tend to leach out of the thermoplastic over time. The present resins overcome the leaching problem by reacting into the polymer network.

The resins have value as rheology modifiers for coatings. Desirable compositions will have low viscosity under high shear conditions (e.g., during spraying from a nozzle), but will have high viscosity at low shear (e.g., during film formation on the substrate). The resins of the invention, because of their uniquely broad molecular weight distribution, will offer coating formulators a high degree of flexibility in modifying rheology.

The resins can also be combined with polyester monomers (glycols, anhydrides, diacids) for the synthesis of "hybrid resins" (see, e.g., U.S. Pat. Nos. 5,153,261 and 5,296,544). Moreover, the resins can be combined with glycol diacrylates to make conventional, UV-curable coatings, or they can be used in powder coatings as high-Tg, crosslinkable resins with low melt viscosity. The resins can even replace unsaturated polyester resins in applications such as hot-melt, thermoplastic adhesives. In sum, the resins of the invention have wide utility limited only by the imagination of the skilled practitioner.

The following examples merely illustrate the invention. Those skilled in the art will recognize many variations that are within the spirit of the invention and scope of the claims.

EXAMPLE 1

Preparation of an Allylic Copolymer Resin With High Polydispersity

Allyl monopropoxylate (50 g), diallyl phthalate (50 g), and t-amyl peroxy-2-ethylhexanoate (6.0 g) are charged to a two-liter glass reactor equipped with agitator, heating mantle, temperature controller, nitrogen purge device, and addition funnel. n-Butyl acrylate (200 g) and styrene (650 g) are mixed, and an initial charge (20 g) of this mixture is added to the reactor. The remainder is mixed with t-amyl peroxy-2-ethylhexanoate (14 g), purged with nitrogen, and charged to the addition funnel. The mixture in the addition funnel is kept at 5° C. with an external chiller. A portion (41 g) of the styrene/n-butyl acrylate/peroxide mixture is added to the reactor, which is then purged three times with nitrogen and heated to 145° C. The monomer/initiator mixture is added to the reactor over 6 h at a constant rate of about 140 g/h. Following monomer addition, the reaction continues at 145° C. for 30 min. Unreacted monomers are removed by vacuum distillation at 145° C. to 175° C. The resulting allylic copolymer resin has Mn=17,050, Mw=194,880, and Mw/Mn=11.4.

COMPARATIVE EXAMPLE 2

The procedure of Example 1 is generally followed, except that no diallyl phthalate is used. Styrene (450 g) is copolymerized with butyl acrylate (400 g) and allyl monopropoxylate (150 g). The resulting allylic copolymer resin has Mn=11,460, Mw=29,670, and Mw/Mn=2.59.

COMPARATIVE EXAMPLE 3

The procedure of Example 1 is generally followed, except that a reduced amount of diallyl phthalate is used. Styrene (650 g), butyl acrylate (200 g), allyl monopropoxylate (100 g), and diallyl phthalate (10 g) are copolymerized. The resulting allylic copolymer resin has Mn=14,410, Mw=43,810, and Mw/Mn=3.04.

The preceding examples are meant only as illustrations; the following claims define the scope of the invention.

We claim:

1. A process for making a copolymer resin, said process comprising:
    (a) first, copolymerizing an ethylenic monomer in the presence of a monofunctional allyl mnomer and a free-radical initiator to produce a reaction mixture that contains residual, unreacted allyl monomer;
    (b) second, exhausting the supply of allyl monomer in the reaction mixture by adding only ethylenic monomer to the mixture; and
    (c) third, copolymerizing the remaining ethylenic monomer substantially in the absence of any allyl monomer to produce the coplymer resin, which has a polydispersity (MW/Mn) within the range of about 5 to about 30.

2. The process of claim 1 wherein the ethylenic monomer is selected from the group consisting of vinyl aromatic monomers, (meth)acrylic acids, (meth)acrylate esters, conjugated dienes, and mixtures thereof.

3. The process of claim 1 wherein the monofunctional allyl monomer is selected from the group consisting of allylic alcohols, alkoxylated allylic alcohols, allyl ethers, allyl esters, allyl amines, allyl carbonates, and mixtures thereof.

4. The process of claim 1 wherein the copolymer resin has a polydispersity within the range of about 10 to about 25.

5. The process of claim 1 wherein the copolymer resin has a bimodal molecular weight distribution.

6. A copolymer resin made by the process of claim 1.

* * * * *